UNITED STATES PATENT OFFICE.

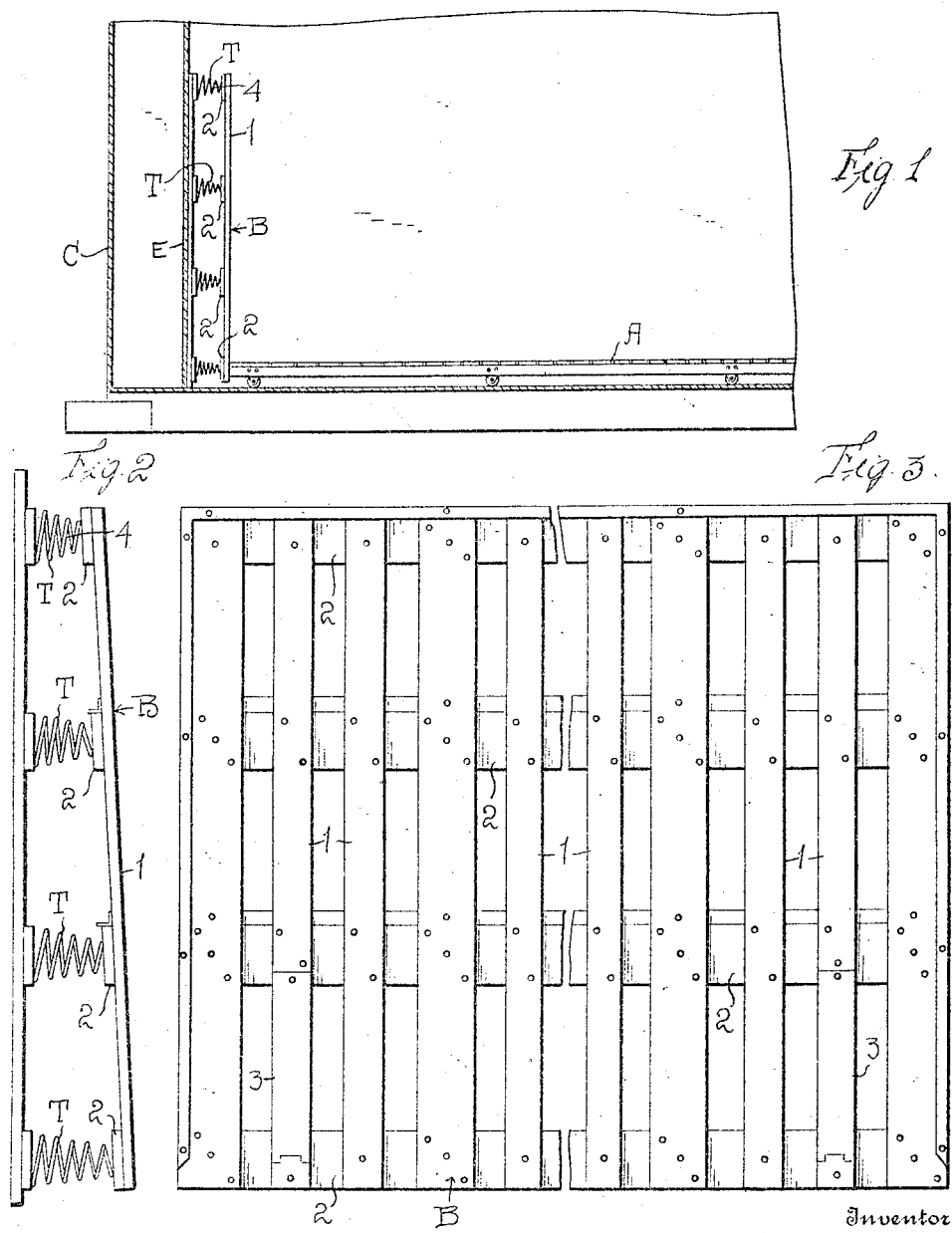

GEORGE E. CUTLER, OF MOUNT VERNON, NEW YORK, AND BERT L. MONESMITH, OF CRESCO, IOWA.

SHOCK-ABSORBER.

1,289,122.     Specification of Letters Patent.     Patented Dec. 31, 1918.

Application filed August 13, 1917, Serial No. 186,009. Renewed May 25, 1918. Serial No. 236,651.

*To all whom it may concern:*

Be it known that we, GEORGE E. CUTLER, a citizen of the United States, residing at Mount Vernon, in the county of Westchester and State of New York, and BERT L. MONESMITH, a citizen of the United States, residing at Cresco, in the county of Howard and State of Iowa, have invented certain useful Improvements in Shock-Absorbers, of which the following is a specification, reference being had therein to the accompanying drawing.

This invention relates to certain improvements in shock absorbers and it is an improvement on our prior Patent No. 1,165,573, dated December 28, 1915, and it is an object of the invention to provide a device of this general character including a load sustaining element co-acting with the carrier and movable in the same general direction of the carrier and a vertically disposed end shock absorber co-acting with each end of the load sustaining element together with novel and improved means to compensate for the different impact of the load at the top and bottom thereof.

The invention also has for an object to provide a novel and improved device of this general character including an end shock absorber co-acting with a load sustaining element together with a spring set operating in conjunction with the end shock absorber for the purpose of maintaining perpendicularity under circumstances of irregular pressure and uneven impact as afforded by the load.

The invention consists in the details of construction and in the combination and arrangement of the several parts of our improved shock absorber wherein certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood we will now proceed to describe the same with reference to the accompanying drawings wherein—

Figure 1 is a fragmentary view partly in elevation and partly in longitudinal section illustrating a shock absorber constructed in accordance with an embodiment of our invention;

Fig. 2 is an enlarged view in side elevation of an end shock absorber as herein embodied and free of compression; and Fig. 3 is a view in front elevation, with an intermediate portion broken out of an end shock absorber as herein included.

As disclosed in the accompanying drawings C denotes a freight car or other carrier which of itself may be of any desired construction and design and A denotes a movable floor or load sustaining element movable in the same general direction as the direction of travel of the car or carrier.

Co-acting with each end of the movable floor or load sustaining element A is a shock absorber B. The lower marginal portion of the shock absorber B overlaps the adjacent end portion of the movable floor or load sustaining element A and extends a predetermined distance thereabove but preferably co-extensive, vertically considered, with the load positioned upon the movable floor or load sustaining element A.

As here disclosed each of the end shock absorbers B comprises the vertically disposed slats 1 secured to the horizontally disposed beams 2. Certain of the slats 1 have their lower portions provided with the hinged sections 3 to afford means whereby convenient access may be had rearwardly of the shock absorber for the purpose of cleaning.

Interposed between each of the end shock absorbers B and the adjacent end wall E of the car or carrier C is a plurality of horizontally disposed tiers T of coil springs and said tiers T are arranged in predetermined spaced relation. It is essential that the springs within each of the tiers be successively of greater tension from the top tier downwardly and in practice it has been found of advantage to have each of the springs 4 spiral, with the springs of each successive tier T of increased length with the shorter springs 4 uppermost. By this arrangement the end shock absorber possesses greater tension at the base thereof or in longitudinal alinement with the movable floor or load sustaining element A. In practice this particular spring set serves to compensate wholly for the uneven impact vertically in the load imposed upon the movable floor or load sustaining element, as perpendicularity of the load is maintained under circumstances of irregular pressure and uneven impact. This advantageous result has been fully demonstrated in actual practice and at this time we wish to state that the variations in the tension of the end shock absorber at the top and bottom thereof is of material import.

From the foregoing description, it is thought to be obvious that a shock absorber constructed in accordance with our invention is particularly well adapted for use by reason of the convenience and facility with which it may be assembled and operated and it will also be obvious that our invention is susceptible of some change and modification without materially departing from the principle and spirit thereof and for this reason we do not wish to be understood as limiting ourselves to the precise arrangement and formation of the several parts herein shown in carrying out our invention in practice except as hereinafter claimed.

We claim:

1. In combination with a carrier, a load sustaining element co-acting with the carrier and movable in the same general direction as the direction of travel of the carrier, and vertically disposed end shock absorbers overlying the adjacent ends of the movable load sustaining element and maintaining the same under compression, the tension of each of the shock absorbers varying vertically.

2. In combination with a carrier, a load sustaining element co-acting with the carrier and movable in the same general direction as the direction of travel of the carrier, and vertically disposed end shock absorbers overlying the adjacent ends of the movable load sustaining element and maintaining the same under compression, the tension of each of the shock absorbers varying vertically, with the greater tension at the bottom.

3. In combination with a carrier, a load sustaining element co-acting with the carrier and movable in the same general direction as the direction of travel of the carrier, and vertically disposed end shock absorbers overlying the adjacent ends of the movable load sustaining element and maintaining the same under compression, the tension of each of the shock absorbers increasing downwardly from the top thereof.

4. In combination with a carrier, a load sustaining element co-acting with the carrier and movable in the same general direction as the direction of travel of the carrier, and vertically disposed end shock absorbers overlying the adjacent ends of the movable load sustaining element and maintaining the same under compression, each end shock absorber comprising vertically spaced tiers of compression members, said tiers being successively of greater tension.

5. In combination with a carrier, a load sustaining element co-acting with the carrier and movable in the same general direction as the direction of travel of the carrier, and vertically disposed end shock absorbers overlying the adjacent ends of the movable load sustaining element and maintaining the same under compression, each end shock absorber comprising vertically spaced tiers of compression members, said tiers being successively of greater tension from the top downwardly.

6. In combination with a carrier, a load sustaining element co-acting with the carrier and movable in the same general direction as the direction of travel of the carrier, and vertically disposed end shock absorbers overlying the adjacent ends of the movable load sustaining element and maintaining the same under compression, each end shock absorber comprising vertically spaced tiers of springs, said tiers being successively of greater tension, the springs of each tier being spiral.

7. In combination with a carrier, a load sustaining element co-acting with the carrier and movable in the same general direction as the direction of travel of the carrier, and vertically disposed end shock absorbers overlying the adjacent ends of the movable load sustaining element and maintaining the same under compression, each end shock absorber comprising vertically spaced tiers of springs, said tiers being successively of greater tension, the springs of each tier being spiral, and successively of greater length.

8. In combination with a carrier, a load sustaining element co-acting with the carrier and movable in the same general direction as the direction of travel of the carrier, and vertically disposed end shock absorbers, the tension of each of the shock absorbers varying vertically.

9. In combination with a carrier, a load sustaining element co-acting with the carrier and movable in the same general direction as the direction of travel of the carrier, and vertically disposed end shock absorbers, the tension of each of the shock absorbers varying vertically, the greater tension being at the bottom.

In testimony whereof we hereunto affix our signatures in the presence of two witnesses.

GEO. E. CUTLER.
BERT L. MONESMITH.

Witnesses for Cutler:
   ARTHUR N. CUTLER,
   ANNA MCCARTHY.
Witnesses for Monesmith:
   A. J. THOMSON,
   J. P. THOMSON.